Patented Feb. 13, 1951

2,541,874

UNITED STATES PATENT OFFICE 2,541,874

METHOD FOR EXTRACTING OF LACTAMS FROM AQUEOUS SOLUTIONS CONTAINING THE SAME

Kurt Kahr, Ems, Switzerland, assignor to Inventa A.-G. für Forschung und Patentverwertung Lucerne, Lucerne, Switzerland No Drawing. Application January 18, 1950, Serial No. 139,319. In the Netherlands January 29, 1949

3 Claims. (Cl. 260—239.3)

Lactams are generally obtained by subjecting cyclic oximes to Beckmann's rearrangement with the aid of strong or anhydrous sulfuric acid or oleum. The product of reaction obtained in this manner is mixed with an aqueous neutralising agent, whereby a water containing crude lactam separates from a sulfate solution which is almost or completely saturated. This water containing crude lactam is separated from the sulfate solution and purified by distillation. However, the remaining sulfate solution according to its concentration then contains still 1 to 2% of dissolved lactam, which corresponds to 6 to 12% of the total lactam yield. In order to make the process economical it is necessary to recover the lactam dissolved in the sulfate solution. For this purpose the sulfate solutions have previously been extracted with chloroform or methylene chloride. For isolating the lactam the solvent must then be evaporated whereby more or less large losses of solvent always occur.

I have now found that aqueous solutions containing a lactam can be worked up much more advantageously if the lactam is extracted from said solutions by the aid of the melted cyclic oxime corresponding to the lactam, i. e. the oxime from which the lactam is formed by the Beckmann rearrangement. The lactam-containing oxime thereby obtained, after having been separated from the aqueous solution can be directly converted by the Beckmann rearrangement and in this way worked up to the lactam. In this manner, the extracted lactam is obtained almost quantitatively together with the newly formed lactam. If it is desired to treat an aqueous sulfate solution, obtained by neutralisation of the mixture of rearrangement of an oxime, said solution is separated, preferably while still hot, from the water containing crude lactam, whereupon said solution is immediately extracted. This can be effected without difficulty because the solubility of the lactam in the hot sulfate solution is scarcely different from that in the cold solution. The amount of oxime necessary for the manufacture of the lactam is sufficient for the complete extraction of the lactam-containing sulfate solution, especially when the extraction is carried out in countercurrent. Even with an extraction ratio of 1 vol. oxime to 10 vols. lactam-containing sulfate solution approximately 90% of the dissolved lactam is obtained.

The solubility of for example, cyclohexanone-oxime in cold saturated ammonium sulfate solution is below 1% and in the hot solution it is approximately three times as much. By cooling the extracted sulfate solution, therefore, ⅔ of the oxime dissolved in the hot solution are recovered by filtration, so the loss of cyclohexanone oxime in the extraction is practically negligible. As the sulfate solution is diluted, the solubility of the oxime increases. For example the solubility of cyclohexanone oxime in a cold ammonium sulfate solution which contains less than 30% of ammonium sulfate is about 0.1% and with a 10% solution amounts to about 0.5%. Cyclic oximes with more than 6 carbon atoms in the ring show an analogous behaviour. The oximes with 6 to 11 carbon atoms in the ring, such as cyclohexanone oxime, suberone oxime, cyclooctanone oxime, cyclononanone oxime, cyclodecanone oxime and cycloundecanone oxime are preferred, and used for extracting the corresponding lactams i. e. caprolactam, oenantholactam, $\omega$-aminooctylic acid lactam, $\omega$-aminononylic acid lactam, $\omega$-aminodecylic acid lactam, and $\omega$-amino-undecylic acid lactam.

On the further working up of the lactams by polymerisation to polyamides, products are obtained which still contain considerable amounts of unchanged lactam, for example 8–12%, which are separated by extraction with hot water. The aqueous solution so obtained can also be extracted in the above-mentioned manner, preferably by adding it to the sulphate solution to be extracted and obtained by neutralisation of an oxime-rearrangement mixture, and extracting the mixture with the molten oxime. In this case also no substantial losses in oxime occur.

The extraction of the aqueous lactam solution with the molten oximes can also be carried out continuously. Preferably the process is carried out so that the fresh melted oxime is brought together with a solution which has been once extracted, and the oxime which has already been used for one extraction is brought together with fresh aqueous solution, or the fresh melted oxime and the aqueous lactam solution are conducted in counter-current through the extraction-tower. The parts indicated in the following examples are parts by weight.

Example 1

3050 parts of an ammonium sulfate solution containing 1.2% of caprolactam and having a specific gravity of 1.238 at 20° C. are stirred three times at a temperature of 80° C. with fresh water containing molten cyclohexanone oxime, 267 parts of oxime being used each time. There is thereby obtained 839 parts of lactam containing oxime. The hot sulfate solution no longer contains any lactam but does contain about 0.18% oxime. After cooling to 20° C. and filtering off the precipitated oxime, it contains only 0.06% oxime. The lactam containing oxime is now treated with 960 parts of 20% oleum and added at 115° C. while stirring and cooling to 500 parts of a cyclohexanone oxime rearrangement mixture which has already been reacted. After standing 1 hour at a temperature of 100° C. the total mixture is neutralised by letting it flow into a 14.3% aqueous ammonia solution at 20° C. whereby 1065 parts of lactam containing oil are separated. When this oil was distilled in vacuo, 713 parts of crude lactam were obtained, that is 33 parts more than would have resulted if the oxime used for the extraction would have been rearranged alone. On the vacuum distillation of the crude lactam the yield of pure lactam is correspondingly increased.

*Example 2*

2580 parts of a sodium sulfate solution containing 1.0% of caprolactam and having a specific gravity of 1.324 at 35° C. are extracted three times at a temperature of 80° C. with fresh water containing molten cyclohexanone oxime, 150 parts of oxime being used each time. The oxime extracts are combined and give a total amount of 476 parts of lactam containing oxime. By rearrangement with fuming sulfuric acid as in Example 1 and neutralisation of the reaction product with a 20.6% sodium hydroxide solution at a temperature of 35° C., and working up the lactam containing oil as indicated in Example 1, there are obtained 23 parts more of crude lactam than corresponds to the amount of oxime used.

*Example 3*

Into a heated tower provided with two stirring zones confined by perforated plates and separated by a quieting zone an ammonium sulfate solution containing caprolactam and having a specific gravity of 1.220 at 0° C. is introduced from above at an hourly rate of 2990 parts. Fresh molten cyclohexanone oxime having a temperature of 80° C. is introduced at the bottom of the tower at an hourly rate of 800 parts. The oxime mounts through the two stirring zones to the top of the tower whereby it extracts 78 parts caprolactam per hour from the sulfate solution. The lactam containing oxime flows off from the top of the tower and the ammonium sulfate solution freed from the lactam leaves the tower at the bottom. The lactam containing oxime is worked up as indicated in Example 1.

*Example 4*

A mixture of 3300 parts of an ammonium sulfate solution of specific gravity 1.235 at 20° C. containing 1.2% of caprolactam and 1400 parts of an approximately 5% aqueous caprolactam solution from the extraction of crude polyamide are extracted three times at 80° C. each time with 267 parts of fresh molten cyclohexanone oxime. There is obtained a total of 900 parts of lactam containing oxime, which gives on rearrangement and neutralisation in the manner indicated in Example 1 additional 90 parts approximately of crude lactam.

What I claim is:

1. In a method of working up aqueous solutions containing lactams, the steps of extracting the lactam with the melted cyclic oxime from which it is derived and subjecting the lactam containing oxime to Beckmann's rearrangement process.

2. A method according to claim 1, wherein a mixture of a lactam containing aqueous sulfate solution and a lactam containing aqueous solution which has been obtained by extraction of a crude polyamide containing unreacted lactam is extracted with the melted oxime from which the lactam is derived.

3. A method according to claim 1, characterised in that the extraction of the aqueous solution is carried out continuously and in countercurrent.

KURT KAHR.

No references cited.